No. 774,940. PATENTED NOV. 15, 1904.
J. GODDARD.
CAMERA BRACE.
APPLICATION FILED AUG. 8, 1904.
NO MODEL.

WITNESSES:
Jerome H. Gurney
Clara M. Fisher

INVENTOR:
Joseph Goddard
by W. H. Cooley, Atty.

No. 774,940.

Patented November 15, 1904.

UNITED STATES PATENT OFFICE.

JOSEPH GODDARD, OF ROCHESTER, NEW YORK.

CAMERA-BRACE.

SPECIFICATION forming part of Letters Patent No. 774,940, dated November 15, 1904.

Application filed August 8, 1904. Serial No. 219,842. (No model.)

*To all whom it may concern:*

Figure 1:
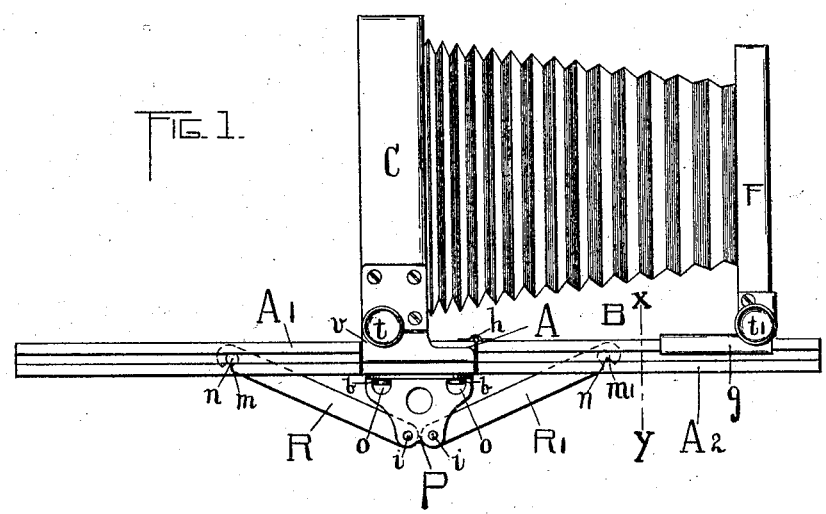
Figure 2:
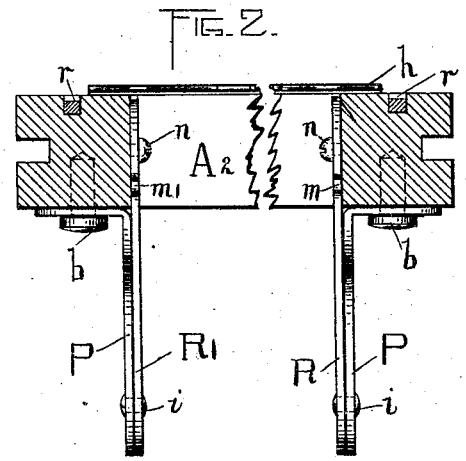
Figure 4:
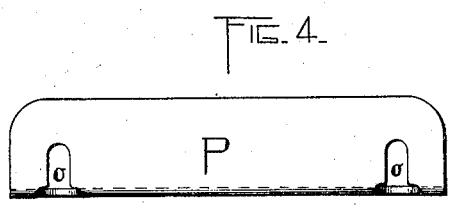
Figure 3:
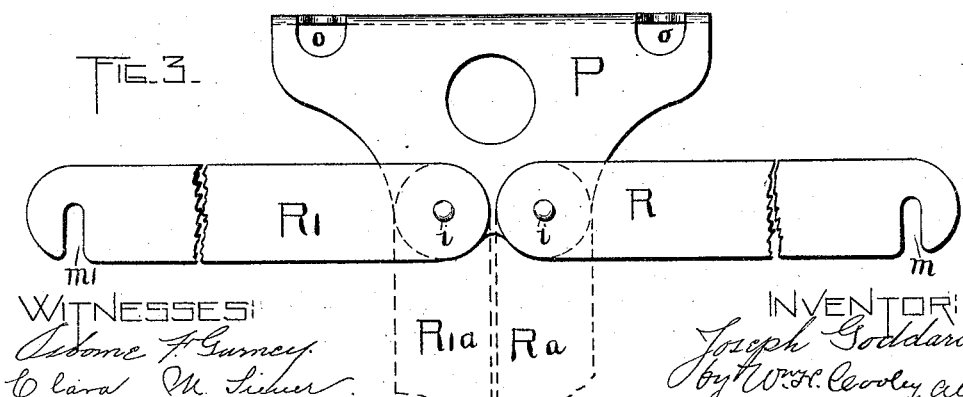

Be it known that I, JOSEPH GODDARD, a citizen of the United States, and a resident of Rochester, in the county of Monroe and State of New York, have invented a new and Improved Camera-Brace, of which the following is a specification, reference being made to the accompanying drawings, which are as follows:

Figure 1 is a camera having my improved brace attached to the bed thereof. The lens-standard of the camera is shown as drawn out upon the forward extension of the bed. Fig. 2 is an enlarged section of the bed seen to the left of the line $x\,y$, Fig. 1. Fig. 3 is a side view of one of my braces removed from the camera and shows in dotted lines the positions that the arms R and R' take when folded up. Fig. 4 is a plan or top view of the plate P, Fig. 3.

Similar letters refer to similar parts throughout the several views.

This invention, while applicable to many cameras in general, is more especially adapted to folding view-cameras—that is, cameras in which the bed is made in two or more sections, arranged to fold up, so as to reduce the space occupied by the camera in transportation or in carrying.

The object of my present invention is to provide a brace for such cameras which shall be readily attachable to any and all cameras of the general class described without the necessity of mutilating the cameras in any way or attaching thereto anything more than the usual screws or screw-studs.

It is the purpose of this invention to provide a brace of the character indicated which shall be equally applicable to any of the different makes of folding view-cameras now on the market.

With this object in view my invention consists, essentially, in an element capable of being readily and rigidly attached to one of the members of the bed of a folding view-camera and in a bracing-piece, preferably articulating with such element and capable of engaging a suitable screw or stud on another member of the camera-bed in such a way as to rigidly lock the members of such camera-bed, so as to prevent their bending under the weight or strain of the parts carried thereby. It is important, therefore, that there shall be a brace rigidly attached to a fixed point upon one camera element and that this brace should extend and be secured to a fixed point projecting somewhat beyond, preferably below, another element of the camera-bed.

Referring to the drawings, P constitutes the body-plate of my camera-brace which is struck out of sheet metal and formed up, as indicated in Figs. 1, 2, 3, and 4. There is struck out from this body-piece P, as indicated in Figs. 3 and 4, openings $o\,o$, located at the angle or bend in the plate P and so conformed as to render such plate by reason of such holes readily insertible under the heads of the screw-studs $b\,b$, as indicated in Figs. 1 and 2, the arrangement being such, as will at once be understood, that when forced into place, as indicated in Figs. 1 and 2, the plates P are rigidly held in engagement with the studs $b$ and against the under side of the central section of the bed A of the camera.

Articulating with the lower end of the plate P and upon the rivets $i$ are seen the bracing-links R R'. These links R R' have slots in their free ends for engagement, respectively, with the screws $n$ and $n'$, screwed into the inner face of the outside bars of the rear and front extensions A' and A², respectively, of the camera-bed. The relative positions of the parts when in use are clearly indicated in Figs. 1 and 2.

The manner of applying my brace is as follows: The screw-studs $b\,b$, of which there are two for each brace, are properly located and screwed into the under side of the central section A of the camera-bed. After these screws $b$ have been thus inserted to the proper depth the bracing-plate P is forced into position, and the bracing-links R and R' are, after the camera-bed has been opened out to its extended position, properly located, and the proper positions for the screws $n$ and $n'$ are indicated by marking the location of the slots $m$ and $m'$ in the outer ends of the bracing-links R and R', and then such screws $n$ and $n'$ are inserted in their proper places on the inner faces of the outside rails of the rear and front sections of the camera-bed A' and $A^2$, respectively, after which the bracing-links R and R' are inserted with their free or outer ends into place over the screws $n$ and $n'$.

The body-plate P of my brace being rigidly secured to the central section A of the camera-bed constitutes then, with the bracing-links R and R', brackets for receiving and sustaining any thrust tending to bend or deflect any one of the sections of the camera-bed out of the normal plane therefor. It will at once be understood that this bracing action operates to prevent a deflection or bending upwardly or downwardly of either end of any one of the camera-bed sections A, A', or $A^2$.

In the drawings, C represents the camera-box, and $v$ the foot-plate therefor, while F indicates the camera-front, and $g$ its foot-plate.

$t$ and $t'$ indicate the usual operating-heads for the camera-box C and the camera-front F.

$r$ indicates the usual racks on the upper face of the camera-bed.

$h$ indicates the hinge between the central and front sections A and $A^2$ of the camera-bed, and B indicates the bellows of the camera.

Of my braces there will of course usually be two applied to a camera—one under each side edge of the camera-bed.

The position of the bracing-links R and R' when folded up for packing or transportation is indicated in Fig. 3 at R $a$ and R' $a$, respectively.

What I claim is—

1. In a brace for a camera having a sectional folding bed, a body-plate and means for rigidly but removably securing the same to one of two adjacent sections of such camera-bed, a bracing-link and means for connecting the same to such body-plate and to a fixed point on the other section of such camera-bed, such bracing-link articulating at one end upon a suitable stud or screw.

2. In a brace for a camera having a sectional bed, a body-plate and means for rigidly but removably securing the same to one of two adjacent sections of such camera-bed, a bracing-link and means for connecting the same to such body-plate and to a fixed point on the other section of such camera-bed, such bracing-link articulating at one end upon a suitable stud or screw.

3. In a brace for a camera having a sectional folding bed, a body-plate and means for rigidly but removably securing the same to one of two adjacent sections of such camera-bed, a bracing-link and means for connecting the same to such body-plate and to a fixed point on the other section of such camera-bed, such bracing-link articulating at one end with such body-plate and having a slot in its other end arranged to engage a screw or stud on the other section of such camera-bed.

4. In a brace for a camera having a sectional bed, a body-plate and means for rigidly but removably securing the same to one of two adjacent sections of such camera-bed, a bracing-link and means for connecting the same to such body-plate and to a fixed point on the other section of such camera-bed, such bracing-link articulating at one end with such body-plate and having a slot in its other end arranged to engage a screw or stud on the other section of such camera-bed.

5. In a brace for a camera having a sectional folding bed, a body-plate and means for rigidly but removably securing the same to the center one of three sections of such camera-bed, bracing-links each articulating with such body-plate at one end and each having a slot in its other end for engaging a screw or stud on one of the adjacent sections of such camera-bed.

6. In a brace for a camera having a sectional bed, a body-plate and means for rigidly but removably securing the same to the center one of three sections of such camera-bed, bracing-links each articulating with such body-plate at one end and each having a slot in its other end for engaging a screw or stud on one of the adjacent sections of such camera-bed.

JOSEPH GODDARD.

Witnesses:
OSBORNE F. GURNEY,
CLARA M. SIEUER.